United States Patent [19]
Granada

[11] 4,011,650
[45] Mar. 15, 1977

[54] COLD WORKING PROCESS
[75] Inventor: Richard Paul Granada, West Covina, Calif.
[73] Assignee: International Telephone and Telegraph Corporation, New York, N.Y.
[22] Filed: Oct. 1, 1973
[21] Appl. No.: 402,036
[52] U.S. Cl. .............................. 29/421 R; 29/407; 29/622; 113/116 R
[51] Int. Cl.² ......................................... B23P 17/00
[58] Field of Search ............ 29/421, 407, 593, 622; 113/116; 200/83 A, 83 B, 83 P; 267/159, 160, 164

[56] References Cited
UNITED STATES PATENTS

| 3,123,903 | 3/1964 | Flanagan | 29/421 |
| 3,302,269 | 2/1967 | Cooper et al. | 29/421 |

OTHER PUBLICATIONS

Marks' Mechanical Engineer Handbook, Sixth Edition, McGraw–Hill Book Company, pp. 5 – 3.

*Primary Examiner*—Leon Gilden
*Attorney, Agent, or Firm*—A. Donald Stolzy

[57] ABSTRACT

A thin metal diaphragm of a differential pressure unit (DPU) is stretched beyond its yield point. This method step unexpectedly reduces the spring rate and zero shifts due to line pressure fluctuations and due to differential thermal expansion and contraction between the diaphragm and its support. It also unexpectedly makes the DPU more accurate by allowing for a weaker and more accurate zero spring adjustment.

5 Claims, 32 Drawing Figures

COLD WORKING PROCESS

BACKGROUND OF THE INVENTION

This invention relates to the art of making metal diaphragms, and more particularly to a method of reducing a diaphragm spring rate.

In the past, metal diaphragms have been unduly hard. Accurate zero adjustment has, thus, been difficult with stiff springs. Zero shift temperature compensation and zero shift compensation for line pressure fluctuations have also been difficult to achieve.

SUMMARY OF THE INVENTION

In accordance with the method of the present invention, inaccuracies due to pressure and temperature variations and inaccuracies due to zero adjustment difficulties and other disadvantages of the prior art are unexpectedly overcome by stretching a diaphragm beyond its elastic limit.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
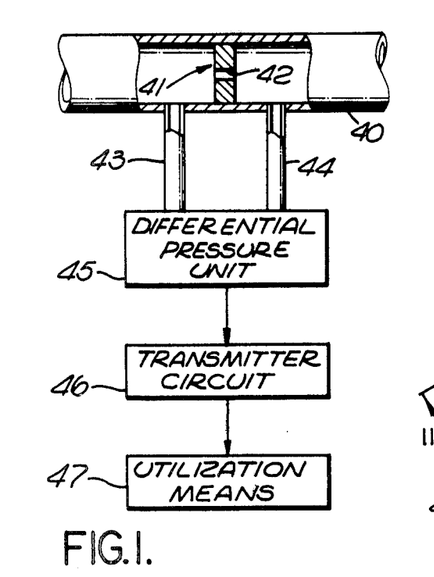
FIG. 1 is a schematic diaphragm of a flowmeter analog source.

In the drawings, in FIG. 1, a pipeline is illustrated at 40 having a disc 41 sealed therein, disc 41 having an orifice 42. Conduits 43 and 44 are connected from pipeline 40 on opposite sides of orifice 42 to a differential pressure unit 45. A transmitter circuit 46 is connected from the output of differential pressure unit 45 (DPU 45) to utilization means 47.

DPU 45 and circuit 46 together form what is commonly known as a transmitter. Utilization means 47 may be a milliammeter calibrated in differential pressure or in volume rate of flow. Alternatively, utilization means 47 may be a process controller or otherwise.

DPU 45 is illustrated in FIGS. 2–15, inclusive.

Transmitter circuit 46 may be any conventional transmitter circuit. Alternatively, transmitter circuit 46 may be identical to that disclosed in U.S. Pat. No. 3,518,886, the two strain gages disclosed hereinafter being substituted for those two strain gages disclosed in the said U.S. Pat. No. 3,518,886. Some of the structures disclosed in U.S. Pat. No. 3,518,886 are duplicated in FIGS. 8 and 9 hereof. Thus, where such structures are duplicated, those structures may be omitted from the portion of the structures which are disclosed in U.S. Pat. No. 3,518,886 when the structures not omitted are incorporated in the transmitter circuit 46.

It may be of assistance to note that throughout the FIGS. 2–15, inclusive, some of the several views are drawn to one scale and others to others different from the said one scale. Some views have been enlarged or greatly enlarged for clarity. Some background lines hae also been omitted in connection with the diaphragms shown in FIGS. 11, 13 and 15, for clarity.

Figure 2:
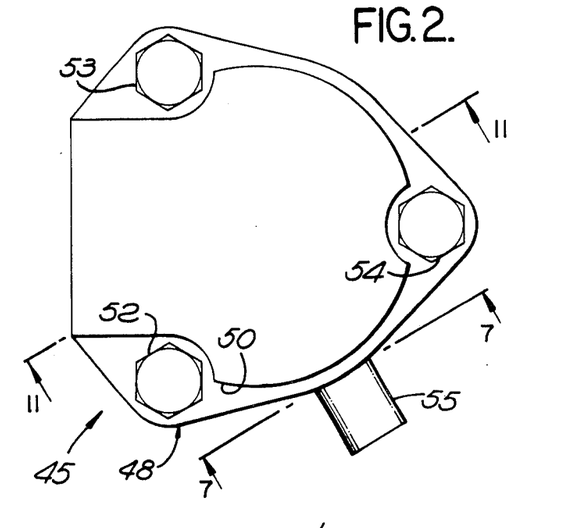
FIG. 2 is a top plan view of a diaphragm-type differential pressure unit (DPU)

In FIG. 2, the DPU is indicated again at 45. DPU 45 has two cover plates. One cover plate is illustrated at 48 in FIG. 2. The other cover plate cannot be seen in FIG. 2 because it is exactly the same size as cover plate 48 and is aligned therewith. The other cover plate is illustrated at 49 in FIG. 3. Cover plate 49 will not be described in detail because it is identical to cover plate 48.

In FIG. 2, cover plate 48 has an upwardly extending boss 50. Both cover plats 48 and 49 are clamped over a body 51 shown in FIG. 3 by bolts 52, 53 and 54, shown in FIG. 2.

Figure 8:
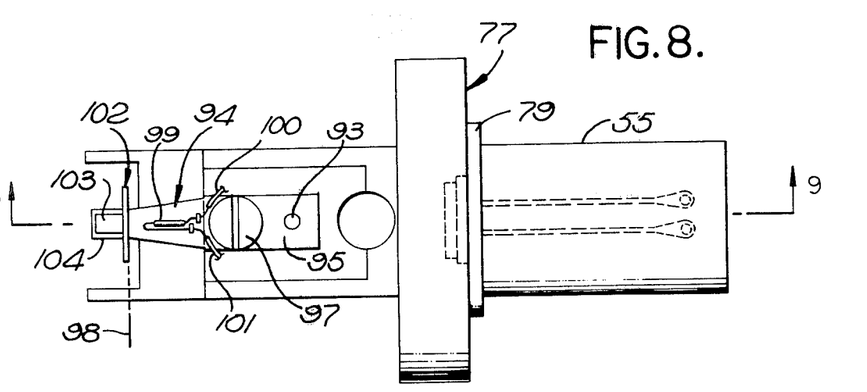
FIG. 8 is a top plan view of a strain gage assembly employed in the DPU of FIGS. 2 and 3.
Figure 9:
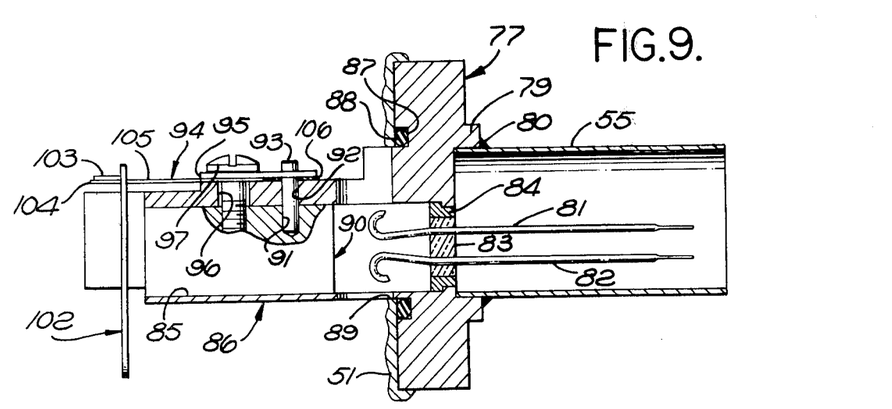
FIG. 9 is a vertical sectional view taken on the line 9—9 of the strain gage assembly shown in FIG. 8.

In FIG. 2, DPU 45 includes a hollow cylindrical tube 55 fixed relative to body 51. Tube 55 provides a housing for electrical leads which may be connected with the DPU 45. Tube 55 is illustrated in FIGS. 8 and 9 on a larger scale.

Figure 3:
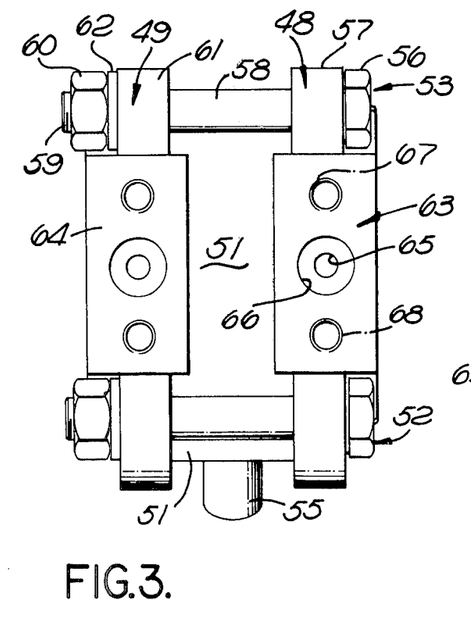
FIG. 3 is a left end elevational view of the DPU shown in FIG. 2.

In FIG. 3, it will be noted that bolt 53 has a head 56 which abuts an ear 57 on cover plate 48. Bolt 53 has a shank 58 which is threaded at 59. A nut 60 is threaded to shank 58 and pulls cover plates 48 and 49 together firmly locking and clamping body 51 in a fixed position relative to the cover plates 48 and 49.

Cover plate 49 has an ear 61. A lock washer 62 is provided around bolt shank 58 between nut 60 and ear 61. Cover plate ears 57 and 61 have holes therethrough through which bolt shank 58 projects. All the bolts 52, 53 and 54 are, more or less, symmetrically positioned and have the same construction, are provided with nuts and lock washers, and help to hold the cover plates 48 and 49 in clamping engagement with body 51 in exactly the same way that bolt 53 does and as illustrated in FIG. 3 and described in connection with the showing in FIG. 3.

Figure 4:
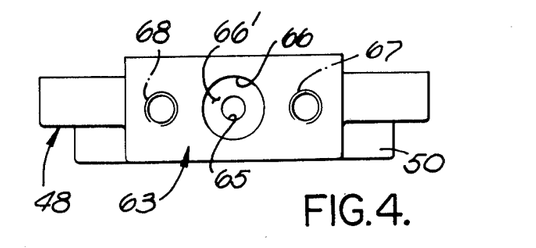
FIG. 4 is an end elevational view of a cover plate, two of which are employed in the DPU of FIGS. 2 and 3.
Figure 5:
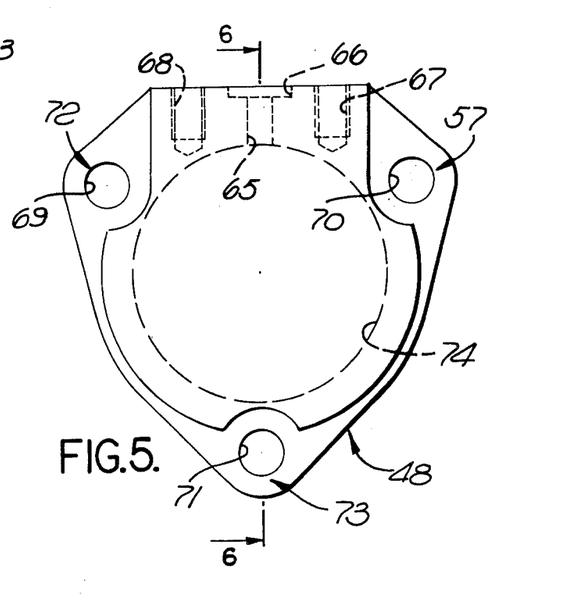
FIG. 5 is a top plan view of the cover plate shown in FIG. 4.

In FIG. 3, each of the cover plates 48 and 49 have end faces 63 and 64, respectively. As will be explained, cover plate 48 forms a first sealed chamber with body 51. Similarly, cover plate 49 forms a second sealed chamber with body 51 different from the said sealed chamber. In FIGS. 4 and 5, cover plate 48, thus, has a port 65 therethrough into the said first sealed chamber. End face 63 of cover plate 48 in FIGS. 3 and 4 has a counterbore at 66. End face 63 of cover plate 48 also has tapped holes 67 and 68 therein. The construction of port 65, counterbore 66 and tapped holes 67 and 68 is merely to provide a fluid coupling to, for example, any conventional conduit and end fitting therefor such as may be employed with conduits 43 and 44. In one example, the conduit itself may have a grooved end surface and an O-ring in the groove to seal against the annular end surface 66' of counterbore 66 and the port 65. See FIG. 4. Cap screws then may be employed to hold the fitting by being threaded into tapped holes 67 and 68.

FIG. 4 is a view of cover plate 48 turned 90 degrees from the position shown in FIG. 3.

FIG. 5 is another top plan view of cover plate 48 illustrating the bolt holes 69, 70 and 71 through ears 72, 57 and 73 thereof, respectively.

In FIG. 5, cover plate 48 is cup shaped and has a cup-shaped chamber or recess 74 therein with which port 65 lies in communication. See FIG. 6.

Figure 7:
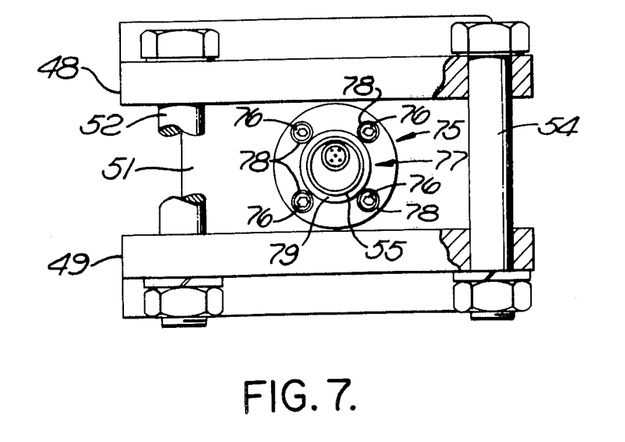
FIG. 7 is a vertical sectional view of the DPU taken on the line 7—7 shown in FIG. 2.

In FIG. 7, a portion of a strain gage assembly 75 is illustrated fixed relative to body 51 by four hex head screws 76 that are slidable through corresponding holes in a flange 77 and are provided with washers 78. Flange 77 is illustrated both in FIGS. 8 and 9. However, the tapped holes in body 51 into which screws are threaded and the holes through flange 77 through which screws 76 are slidable are not illustrated.

As shown in all of the FIGS. 7, 8 and 9, flange 77 is provided with an annular boss 79. Tube 55 is brazed or otherwise fixed to flange boss 79 at 80 as shown in FIG. 9. Tube 55 is also illustrated in FIG. 7.

Four electrical conductors extend from the interior of body 51 to the exterior thereof, although only two such conductors, i.e., conductors 81 and 82, are illustrated in FIG. 9.

All four of the conductors are sealed through a glass disc 83. Glass disc 83 is, in turn, sealed within a metal ring 84. Metal ring 84, is in turn, fixed in a bore 85 of a square tube 86 which is integral with flange 77.

Flange 77 has an O-ring groove 87 therein in which an O-ring 88 is located. Thus, when screws 76 draw flange 77 tight to body 51, a fluid tight seal is provided around an opening 89 through the wall of body 51. The reason for this is that DPU 45, as well as some conventional DPU's, are filled with a liquid. In the instant case, the liquid fills the entire interior of body 51. At least as the space inside thereof is defined thereby and surrounding structures including, but not limited to, two diaphragms will be described.

In the cnstruction illustrated in FIG. 9, a block or square rod section 90 is slidably positioned at the location illustrated in FIG. 9. Body 90 has a hole 91 extending part way thereinto. Tube 86 also has a hole 92 which is aligned with body hole 91. A locator pin 93 is then placed through both of the holes 91 and 92. Pin 93 may be press fit in either one or both of the tube 86 and the body 90.

A leaf spring cantilever beam 94 and a clamping plate 95 have holes which may be approximately aligned with a screw hole 96 through tube 86 and hole 92 into tube 86. Beam 94 and plate 95 may then be put in the position shown in FIGS. 8 and 9, and screw 97 slidably positioned therethrough and screwed into body 90 down tight against plate 95.

Beam 94 and some of the other structures illustrated in FIGS. 8 and 9, to the right of line 98 in FIG. 8, may be entirely conventional. For example, it is conventional to bond a strain gage at the same location on opposite sides of beam 94. Both such strain gages are employed. Only one such strain gage is illustrated at 99 in FIG. 8.

As is well known, each strain gage has two leads. Thus, one lead of each strain gage is connected to a corresponding respective conductor. The other leads of the strain gages are then connected to the respective conductors 81 and 82. An electrical lead 100 is connected from one end of strain gage 99 in FIG. 9. Another electrical lead 101 is connected from the other end of the strain gage 99. The connection of leads 100 and 101, and the two leads from the other strain gage to the conductors, such as conductors 81 and 82, have been omitted for clarity.

A metal stamping 102 illustrated in FIG. 8 has a tab 103 that is brazed or otherwise fixed over its entire area to an end portion 104 of beam 94. See also FIGS. 9 and 10.

In FIG. 9, beam 94 has a portion 105 and a portion 106. Portion 106 is the fixed end portion. Portion 104 is the free end portion. Portion 105 is tapered as shown in FIG. 8. Portion 105 is called the constant strain region and is conventional. Portion 106 is also conventional. Portion 104 is not conventional. Portions 104 and 105 are integral with one another. Similarly, portions 105 and 106 are integral with one another. A top plan view of portion 106 would be identical to a top plan view of plate 95 in a view similar to that shown in FIG. 8.

Figure 10:
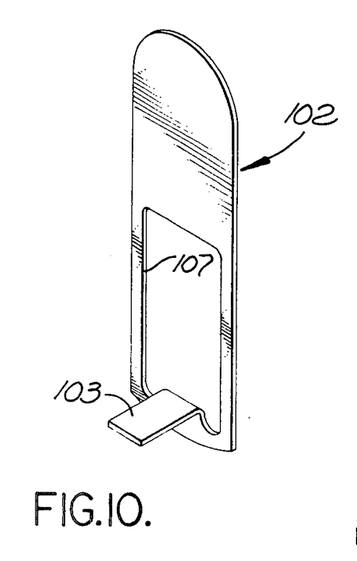
FIG. 10 is a perspective view of a metal stamping shown in FIGS. 8 and 9.

As shown in FIG. 10, stamping 102 is made by shearing an aperture 107 therein which is somewhat U-shaped leaving tab 103, which is struck out, in a plane approximately perpendicular to the plane of the remainder of the stamping 102.

Figure 11:
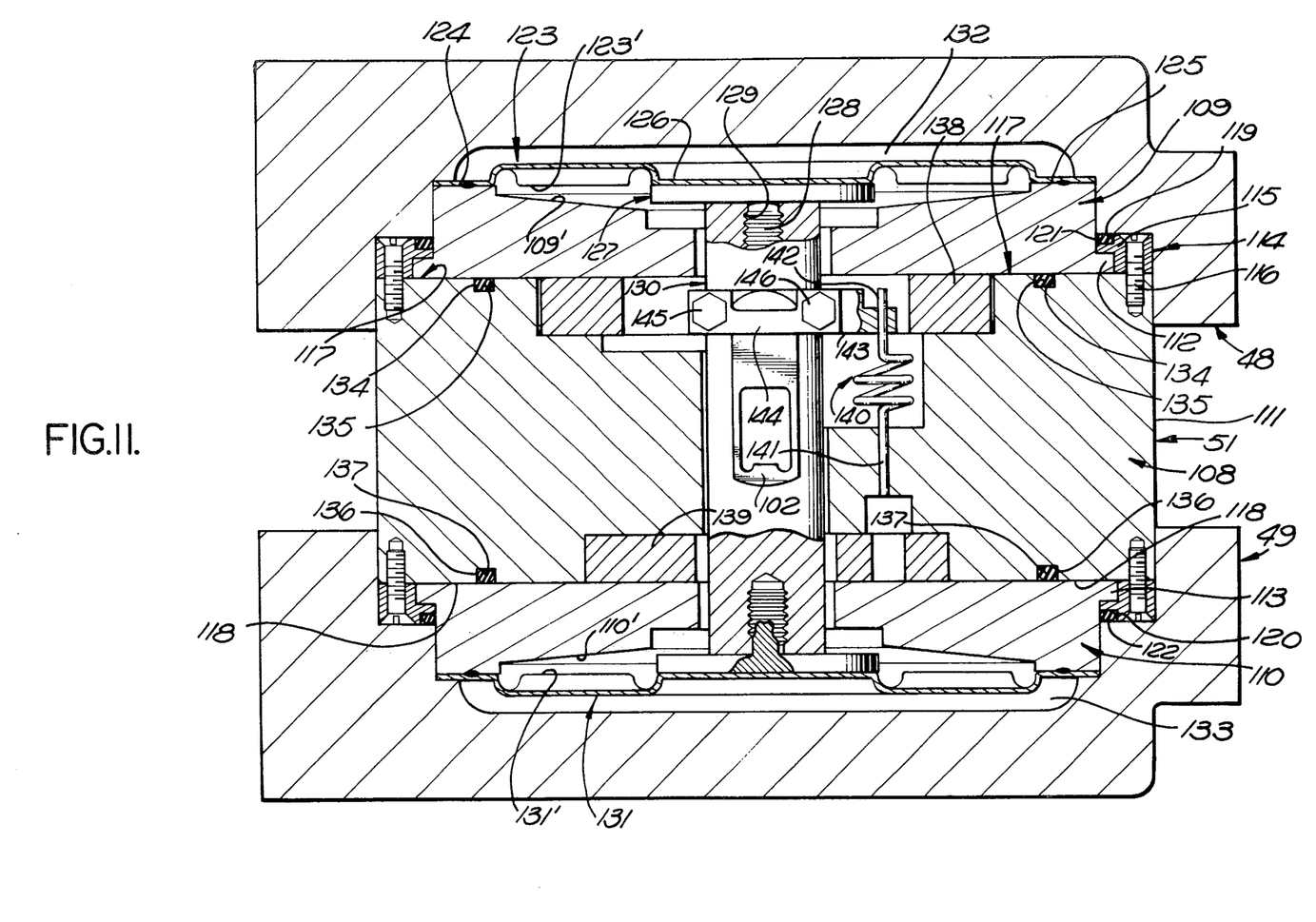
FIG. 11 is a vertical sectional view taken on the line 11—11 of the DPU shown in FIG. 2.

An enlarged sectional view of the DPU 45 taken on the line 11—11 in FIG. 2 is shown in FIG. 11.

In FIG. 11, body 51 is illustrated including a block 108 having plate 109 and 110 fixed against opposite annular end faces 117 and 118, respectively, of the block 108, block 108 having a cylindrical external surface 111 which may or may not be occasionally interrupted by other structures. Plates 109 and 110 are generally cylindrical but have end flanges 112 and 113, respectively.

Plate 109 is held tight against block 108 by a ring 114 that has a flange 115 to overlie flange 112. Preferably, four screws 16 are slidable through ring 114 and threaded into block 108 to hold plate 109 tight to block 108.

Cover plates 48 and 49 are again shown in FIG. 11. Ring 114 has an O-ring groove 119 therein. An O-ring 121 is located in groove 119 of ring 114. O-ring 121 provides a fluid tight seal between cover plate 48 and plate 109.

All the structures shown above the block end face 117, as viewed in FIG. 11, may be identical to all the structures shown below the block end face 118. For this reason, only a portion of the structures shown below block end face 118 will be described in further detail.

In FIG. 11, a generally circular metal diaphragm 123 is illustrated having an annular portion 124 which is seam welded to plate 109 on an annular surface 125 thereof. The seam weld provides a fluid tight seal around the complete circumference of plate 109 and also fixed the annular portion 124 of diaphragm 123 in position relative to plate 109.

In FIG. 11, diaphragm 123 has a circular center portion 126 to which a disc 127 is everywhere bonded. Disc 127 may have a stud 128 integral therewith or otherwise fixed thereto that is threaded into a tapped hole 129 in one end of a center post 130.

Plate 110 similarly has a metal diaphragm 131 fixed thereto. In accordance with the foregoing, both of the diaphragms 123 and 131 are fixed relative to the ends of post 130.

Post 130 is slidable through certain bores in block 108. Preferably the diameters of the bores are oversize so that the post 180 does not touch any of them.

Note will be taken, in FIG. 11, that cover plate 48 and diaphragm 123 are spaced apart and define a chamber 132 therebetween, as mentioned previously. Similarly, cover plate 49 and diaphragm 131 define a chamber 133. Chambers 132 and 133 are fluid tight. For example, chamber 132 is fluid tight because of the use of O-ring 121, and also because the seam weld provides a seal between the annular portion 124 of diaphragm 123 and the annular surface 125 of plate 109.

Figure 6:
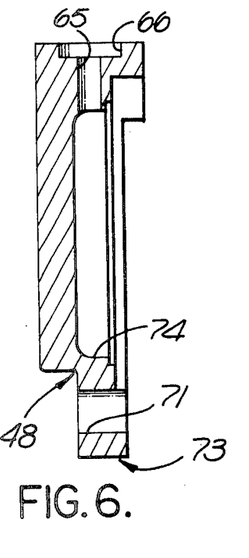
FIG. 6 is a longitudinal sectional view through the cover plate taken on the line 6—6 shown in FIG. 5.

The chambers 132 and 133 are fluid tight except, of course, for port 65 in cover plate 48 shown in FIG. 6 and a port identical to port 65 in cover plate 49.

Block end face 117 has an O-ring groove 134 therein in which an O-ring 135 is positioned to provide a fluid tight seal between block 108 and plate 109. Similarly, an O-ring groove 135 is provided in end face 118, and an O-ring 137 is positioned therein to provide a fluid tight seal between block 108 and plate 110.

Annular filler blocks 138 and 139 are provided to minimize the amount of fluid needed to fill all communicating chambers between the diaphragms 123 and 131, inside thereof. It is conventional, for example, to fill a bellows-type differential pressure unit with a silicone oil or ohter liquid as a partial overpressure protection.

A helically coiled spring 140 is provided having one end 141 fixed to block 108 and another end 142 fixed to a flange 143 which may be fixed to or integral with post 130.

Spring 140 may be omitted in some cases. When spring 140 is omitted, the DPU 45 becomes bi-directional. That is, the pressure in chamber 132 may be higher than that in chamber 133 or the pressure in chamber 133 may be higher than that in chamber 132. As shown, chamber 133 is the high pressure chamber. This is true because the force applied to flange 143 by spring 140 is in opposition to the deflection taken by diaphragm 131 on account of an increase in pressure in chamber 133.

In FIG. 11, stamping 102 is clamped to flange 143 in a fixed position relative to post 130 by a clamping plate 144 that holds stamping 102 tight against flange 143, plate 144 being held in a clamping position on stamping 102 by hex head screws 145 and 146 threaded into flange 143. Screws 145 and 146 thus hold plate 144 tightly against stamping 102, and, in turn, stamping 102 tightly against flange 143.

Portions 123' and 131' of diaphragms 123 and 131 nest in plates 109 and 110 during respective overpressures. When so nest, diaphragm portions 123' and 131' seat upon respective frusto-conical surfaces 109' and 110' of plates 109 and 110, respectively.

Figure 12:
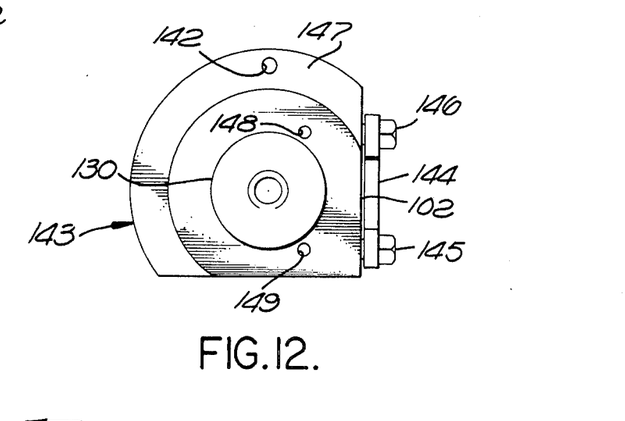
FIG. 12 is an end elevational view also shown in FIG. 11.

As shown in FIGS. 11 and 12, plate 144 is U-shaped.

Flange 143, as shown in FIG. 12, has a step portion 147. Flange 143 also has bleed holes 148 and 149. Bleed holes 148 and 149 extend completely through flange 143 and allows fluid on opposite sides of the flange 143 to flow therethrough more easily to increase the speed of response of the DPU 45, if desired. Alternatively, or in addition, bleed holes 148 and 149 may provide moderate or large restrictions to flow and thereby operate to damp the output of DPU 45.

As stated previously, diaphragm 131 may be identical to diaphragm 123, if desired. Diaphragm 123 will, thus, be the only diaphragm which will be described in further detail.

Figure 13:
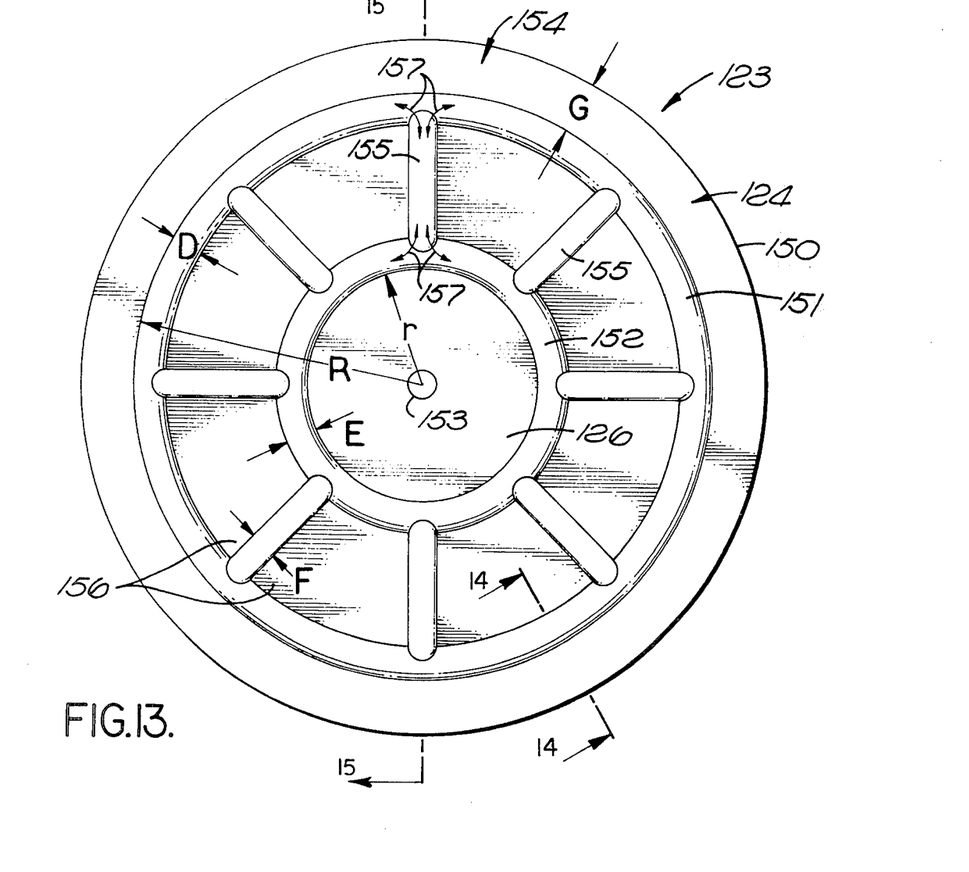
FIG. 13 is a top plan view of a diaphragm.

FIG. 3 is a top plane view of the diaphragm 123. If desired, diaphragm 123 may have a substantially uniform thickness throughout its complete extent. Diaphragm 123 is preferably made by forming a circular, thin, flat blank of uniform thickness equal to about 5 mils of 17–7 or 17–4 precipitation hardenable stainless steel. However, other materials are possible—even plastic. However, the said precipitation hardenable stainless steel is preferable for rupture strength. Other materials which may be used are Martensitic stainless steel, 400 stainless steel, the cobalt alloys such as the Hamilton Watch Company's cobalt alloy sold under the trade name "Elgilloy." Alternatively, 316 stainless steel may be employed. Diaphragm 123 may be made of any formable material having a ductility of 25 percent or more.

Diaphragms 123 and 131 may be made in an identical manner, if desired.

Figure 14:
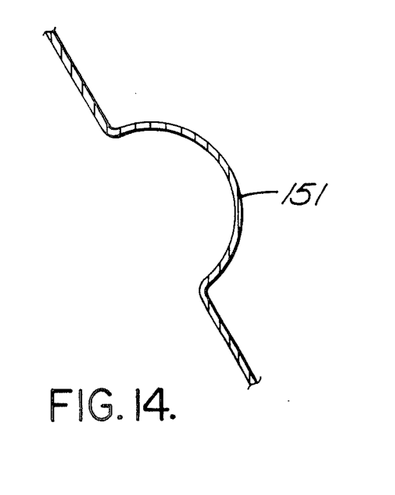
FIG. 14 is a greatly enlarged radial sectional view taken on the line 14—14 of the diaphragm shown in FIG. 13.
Figure 15:
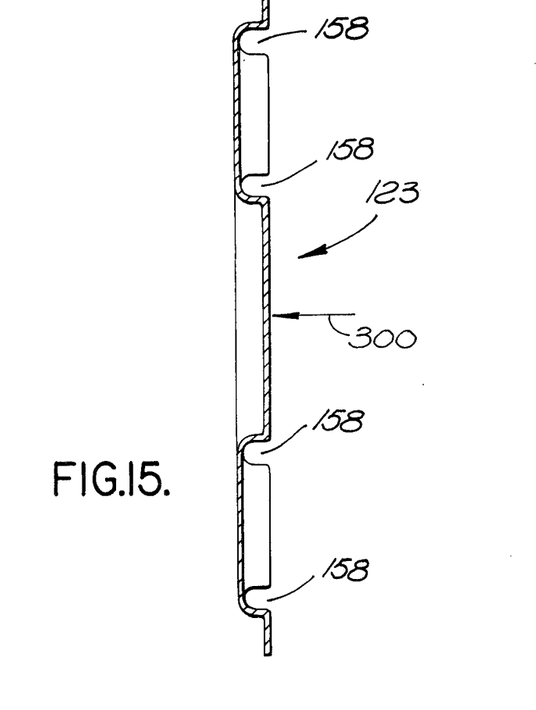
FIG. 15 is a vertical sectional view through the diaphragm shown in FIG. 13 and taken on the line 15—15 therein.

Diaphragm 123 is, thus, formed between dies in a press to the size and shape illustrated, although not necessarily to scale, in FIGS. 13, 14 and 15.

In FIG. 13, diaphragm 123 is shown with the annular portion 124 thereof. Annular portion 124 may have substantially flat parallel surfaces in rspective parallel planes except for a cylindrical surface 150 over the thickness thereof. Diaphragm 123 then has portions 151 and 152 which have opposite surfaces, each of which would generally be defined as one-half of a torus cut by a plane normal to the axis thereof with radii, R and r, defining different torus locations of certain surfaces of the portions 151 and 152.

The axis of the torus which would define one surface of portion 152 would be generally identical to the axis of the torus which would define one surface of portion 151. This axis would lie perpendicular to the plane of the drawing of FIG. 13 through the point 153. The portions 151 and 152 are connected by spokes 155, which with portions 151 and 152, form an embossed wheel 154. Each pair of immeditely adjacent spokes 155 is connected by arcuately shaped webs 156. Each web also connects portions 151 and 152.

Each web 156 when diaphragm 123 is unstressed, has an upper surface that lies generally in the same plane as the upper surface of annular portion 124 and the upper surface of portion 126. The lower surfaces of portions 156, 124 and 126 similarly lie in the same plane.

Spokes 155 have generally a half cylinder shape. They may, for example, have a diameter, F, equal to about 130 mils, as shown in FIG. 15. The dimension, E, shown in FIG. 13 may also be 130 mils, if desired. The same is true of the dimension, D.

In FIG. 13, the dimension, G, may be 115 mils, if desired.

A view of the diaphragm 123 on the reverse side thereof might be substantially identical to that shown in FIG. 13. However, in this case, the embossments would become channels. Note that the diaphragm 123 has the spokes 155 and the portions 151 and 152 which are embossments on one side, i.e. on the side sown in FIG. 13. Thus, on the reverse side, the embossments become channels because diaphragm 123 has a substantially uniform thickness. In such a case, each channel corresponding to one spoke 155 would than lie in communication with channels in corresponding portions 151 and 152 as indicated by arrows 157 in FIG. 13.

If desired, the radius, R, may equal 2½ inches. The radius, r, may be, if desired, ½ inch.

In FIg. 14, preferably portion 151 has a curvature, as shown, which is as nearly accurate to a semi-circle as possible. However, it may be a somewhat more complicated arc. The same would be true of a corresponding radially extending section through portion 152 and a section through a spoke 155 normal thereto.

As stated previously, background lines have been omitted in connection with the diaphragms 123 and 131 in FIGS. 11, 13 and 15 in several places for clarity. For example, background lines have been omitted at 158 in four locations in FIG. 15.

OPERATION

If fluid under pressure is admitted to chamber 133, which has a pressure in excess of the pressure of fluid in chamber 132, diaphragms 123 and 131 will deflect upwardly, as viewed in FIG. 11, moving post 130 in the same direction. Stamping 102 is fixed to post 130 and, therefore, deflects beam 94 shown in FIG. 8 in a downward direction in FIG. 9 because of the view taken. Strain will then be induced in both the strain gages fixed to beam 94, and transmitter circuit 46 connected from the strain gages may cause utilization means 47 to indicate volume rate of flow, for example. As stated previously utilization means 47, in this case, may be a milliammeter calibrated in volume rate of flow or gallons per minute. The output of transmitter circuit 46 in FIG. 1 may then be a D. C. current directly proportional to the difference between the pressures of the fluids in chambers 133 and 132.

Figure 16:
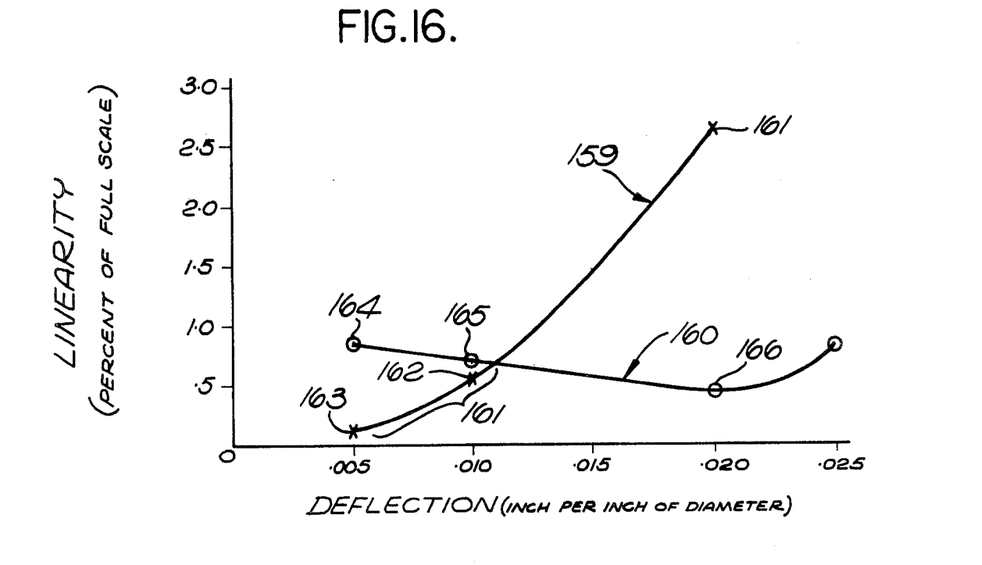
FIG. 16 is a graph of the linearity or non-linearity characteristics of the diaphragm shown in FIG. 13 and a conventional corrugated diaphragm.

One outstanding advantage of the DPU 45 is its linearity. This linearity is plotted at 159 in FIG. 16 as a function of deflection. The linearity of a corrugated circular diaphragm is plotted at 160 in FIG. 16 from data published by the U.S. National Bureau of Standards. In FIG. 16, note will be taken that curve 159 has a portion 161 over a deflection range which has a substantially better linearity than the curve 160. It is, in fact, generally in this area of curve 159 which the diaphragms 123 and 131 are operated.

Actually, it is common to call the curves 159 and 160 "linearity" curves. The fact of the matter is that the function graphed is a function of non-linearity rather than linearity. A point such as the X marked point 162 is taken from performance data. A pressure versus deflection curve is plotted first. The non-linearity, for example, at point 162 is then calculated by drawing a straight line from the origin (0, 0) to a point on the pressure versus deflection curve. The maximum error between zero and, for example, point 162 is measured. The percent linearity (actually non-linearity) for point 162 is then calculated by dividing the maximum error by the ordinate of point 162 and multiplying times 100.

By use of the embossed wheel pattern 154, it is possible to obtain good linearity over a large deflection, and to obtain a large deflection over a small pressure range.

The phrae "means to supply fluid under pressure" is hereby defined for use herein and in the claims to mean any one or more or all of the following, with or without other structures: a source of fluid under pressure, a conduit, a port or a similar admitting orifice.

The word "output," as used herein and in the claims, is hereby defined to include an output which is either mechanical or electrical or otherwise.

The word "integral" is hereby defined for use herein and in the claims to exclude a bolted, screwed, bonded, sealed or other connection of parts fastened together in any other similar ways, but to include only a molded or formed single, unitary piece of material that is found that way in its natural state or has been produced by a chemical reaction or smelted or the like such that it is substantially isotropic throughout a connection of two parts.

The phrase "utilization means" is hereby defined for use herein and in the claims to include, but not be limited to, an ammeter or milliammeter calibrated in volume rate of flow or in differential pressure, a process controller or otherwise.

In FIG. 16, curve 160 has points 164, 165 and 166. The data for all the points 161 to 166, inclusive, are as follows. The diaphragms corresponding to the curves 159 and 160 in FIG. 16 each had a radius, R, equal to 0.875 inches The deflections for points 164, 165 and 166 were respectively equal to ½, 1 and 2 percent of 2R. Points 164, 165 and 166 had percent non-linearities of .8, .7 and .4, respectively. For the same ½, 1 and 2 percent of 2R deflections, points 163, 162 and 161 has percent non-linearities of 0.1, 0.6 and 2.6, respectively.

After diaphragm 123 in FIG. 13 is formed as shown therein and as shown in FIGS. 14 and 15, diaphragm 123 is precipitation hardened. This may be done by any conventional method. For example, diaphragm 123 may be heated in an evacuated chamber to 1,550° F. and the 1,550° F. held for 90 minutes. The diaphragm 123 is then cooled to room temperature by turning off the heat to the vacuum chamber and by passing nitrogen or another gas or gas mixture providing a neutral atmosphere through the vacuum chamber at about one atmosphere. Preferably, the diaphragm 123 is cooled to room temperature within 1 hour immediately succeeding the 90 minute period described above in this paragragh. Diaphragm 123 is then refrigerated to 0° F. for 30 minutes. Diaphragm 123 is then heated in the vacuum chamber again to 1,050° F. and this 1,050° F. temperature held for 90 minutes. The diaphragm 123 is then cooled in the same manner as before.

In an alternative embodiment of the invention, diaphragms may be coated with layers of plastic 2 or 3 mils thick for for corrosion resistance or otherwise.

In the prior art, two openings have sometimes been employed into the interior of a DPU. These openings are employed so that air may be evacuated through one opening, and the fluid to fill the interior of the DPU may be introduced through the other opening. Such openings are not disclosed herein but any conventional ports may be provided for that purpose.

In FIG. 13, the curvature of the portions 151 and 152, and the curvature of the spokes 155 are specially adapted to make the diaphragm 123 strong. It will withstand exceedingly high loads.

Any conventional transducer may be substituted for the portion of a tranducer shown in FIG. 8. Alternatively, the strain gages in FIG. 8 may be bonded to beam 94 by the use of glass, an epoxy or otherwise. As alternatives for the transducer of FIG. 8, a torque tube output or an electromechanical pick-up or other devices are also possible.

Diaphragms 123 and 131 may alternatively be made of 316 stainless steel.

Notwithstanding the foregoing, it will be appreciated that the use of two diaphragms is not always required. The present invention may be practiced by the use of one diaphragm. For prior art on single bellows and differential pressure units, see, for example, U.S. Pat. No. 2,752,949.

As stated previously, the large bonding areas and flexibility of the tab 103 of stamping 102 and its bond over its entire area to the portion 104 of beam 94 in FIG. 8 provide for extremely good accuracy.

The phrase "full scale deflection" is hereby defined to include deflection in one direction only either away from or toward an unstressed position.

Figure 17:
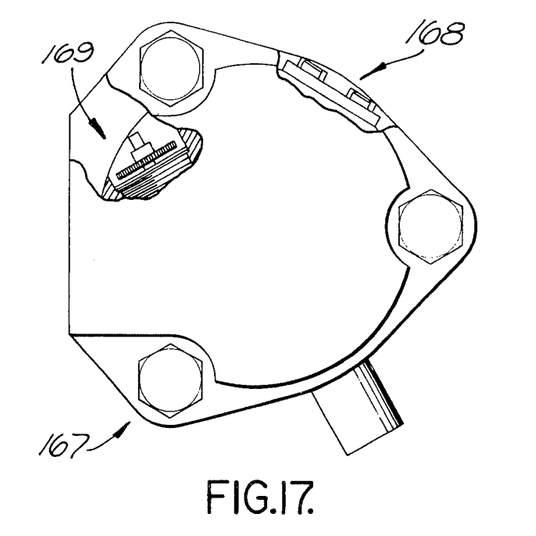
FIG. 17 is a broken away top plan view of a DPU constructed in accordance with the present invention.
Figure 18:
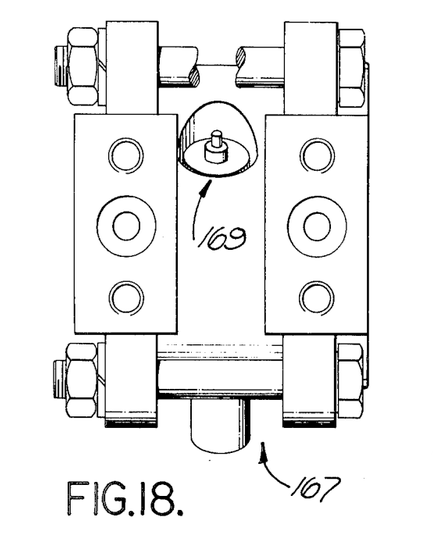
FIG. 18 is a left end elevational view of the DPU shown in FIG. 17.

In FIG. 17, a DPU is indicated at 167. DPU 167 may be identical to DPU 45 except as indicated in the following. DPU 167 has a range spring assembly 168 and a zero spring assembly 169. Both of these are shown in FIG. 17. ONly zero spring assembly 169 is shown in FIG. 18.

Figure 19:
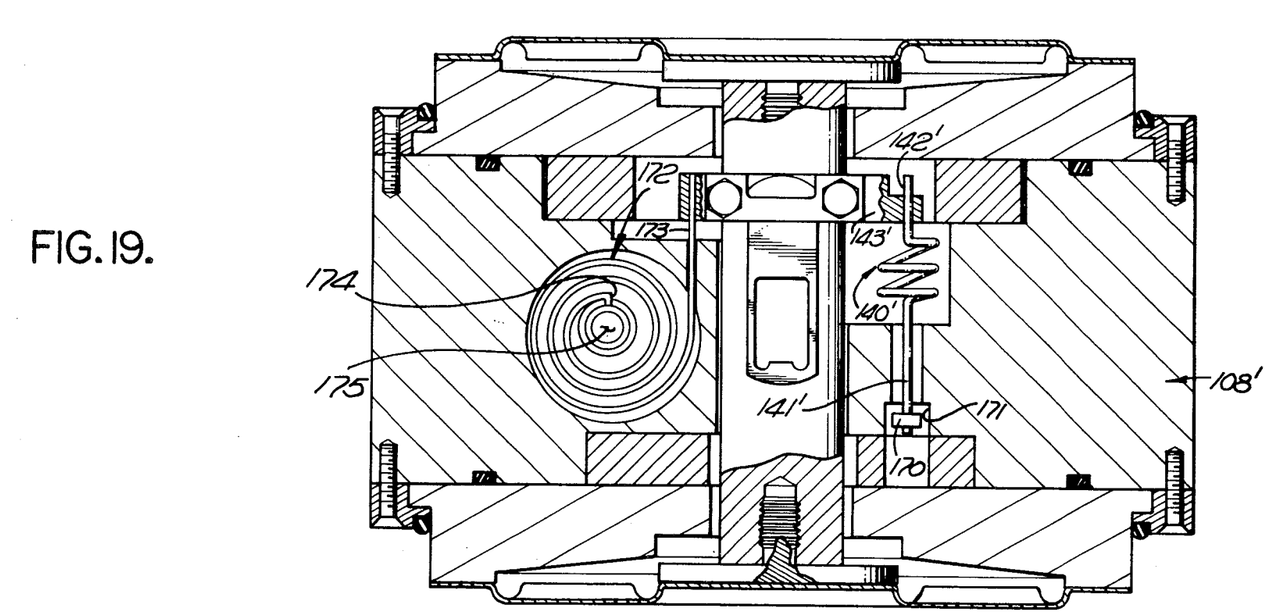
FIG. 19 is a vertical sectional view taken on the line 19—19 of the DPU shown in FIG. 20.
Figure 20:
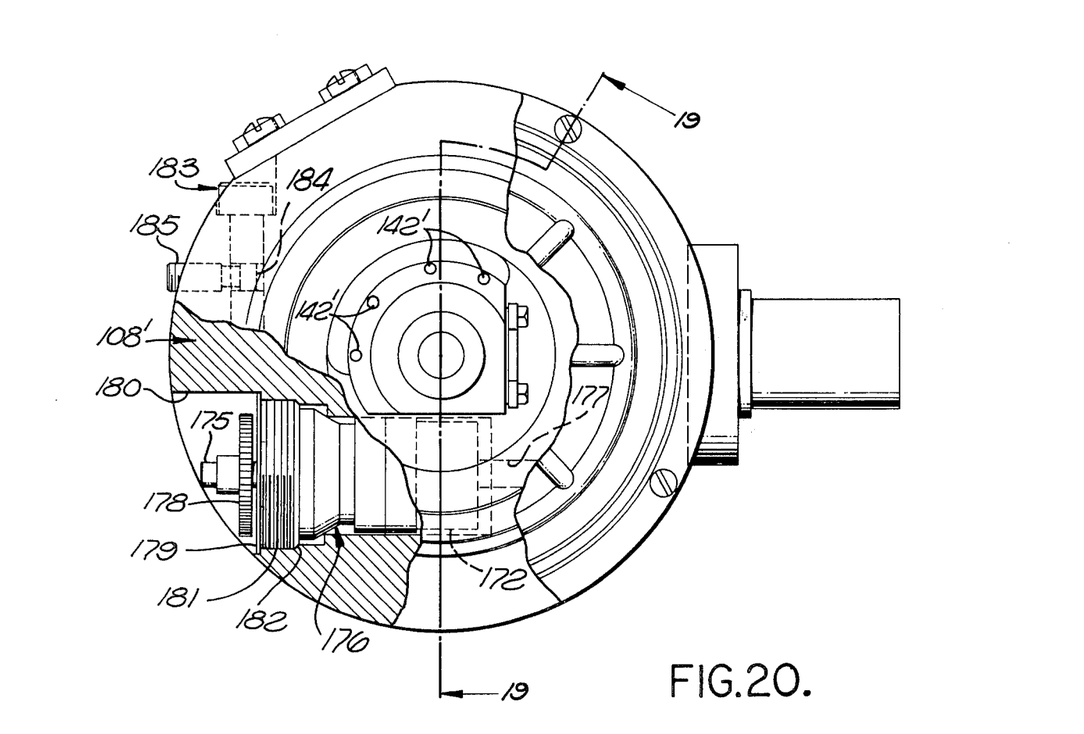
FIG. 20 is a broken away bottom plan view of a central body of the DPU shown in FIGS. 17, 18 and 19.

Note will be taken that many of the structures shown in FIG. 19 are identical to those shown in FIG. 11. For this reason, only the structures in FIG. 19 which are different from the corresponding structures shown in FIG. 11 will be described. In FIG. 19, a range spring 140' has one end 142' fixed to flange 143'. Flange 143' may be identical to flange 143, except that four range springs 140' are connected thereto. Four holes are provided through flange 143', as shown in FIG. 20.

Notwithstanding the foregoing, as indicated in FIG. 19, spring 140' has end portions 141' and 142' that can remain stationary with respect to each other so that the spring 140' is not placed in tension when the diaphragms take a deflection. Spring end 141' has an enlargement 170 fixed thereto which may be clamped against a bore 171 in block 108'.

Also in FIG. 19, a spiral zero spring 172 has an outer end 173 fixed to flange 143', and an inner end 174 fixed to a shaft 175.

In FIG. 20, shaft 175 is again shown rotatable in a zero spring assembly bearing 176 and a bore 177 in the block 108'. Bore 177 may be sufficiently short so as to limit axial movement of shaft 175 to the right, as viewed in FIG. 20, if desired.

In FIG. 20, a worm gear 178 is fixed to shaft 175. A cover plate 179 is press fit into a bore 180 of block 108'. Bearing 176 is threaded into block 108' at 181. Block 108' has a beveled surface 182 against which bearing 176 provides a metal-to-metal seal.

A worm 183 having the head of a hex head socket screw has a reduced diameter at 184 in which rides the end of a set screw 185. Set screw 185 likewise may have a head identical to a hex head socket screw. Axial movement of worm 183 is, therefore, limited by the position of set screw 185 close to the smaller diameter portion 184 of worm 183. However, when set screw 185 is loosened somewhat, even though worm 183 cannot travel a distance axially, it can at least rotate. Rotation of worm 183 increases rotation of worm grear 178. This sets the tension of spiral spring 172. When the tension is proper, set screw 185 is turned into block 108'. It then fixes worm 183 to block 108' so that it cannot rotate or move axially relative thereto while in the desired position.

Figure 21:
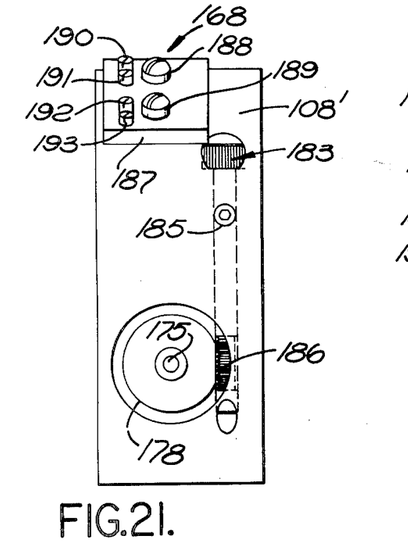
FIG. 21 is a side elevational view of the central body looking from the left side thereof as viewed in FIG. 20.

In FIG. 21, the threaded portion of the worm 183 is illustrated at 186 in mesh with worm gear 178.

FIG. 21, a coveer plate 187 is shown for the range spring assembly 168. Coverplate 187 is fixed to block 108' by cap screws 188 and 189. Each end 141' of each spring 140' may be fixed relative to block 108' or not fixed thereto by rotating one of four screws 190, 191, 192 and 193 in one of its two opposite directions, each of the screws 190 to 193 being provided with a screwdriver slot for that purpose.

Figure 22:
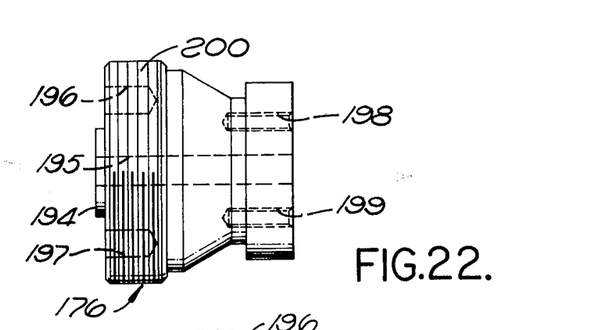
FIG. 22 is a side elevational view of a zero spring assembly bearing.
Figure 23:
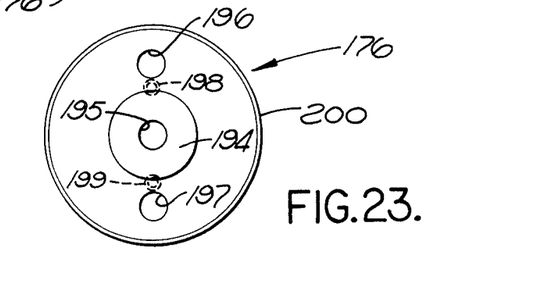
FIG. 23 is an end elevational view of the bearing shown in FIG. 22.

Bearing 176 is shown in FIG. 22 having a boss 194. Bearing 176 also has a bore 195 extending completely therethrough through which and in which shaft 175 is both axially slidable and rotatable, respectively. Bearing 176 also has spanner wrench holes 196 and 197, and tapped holes 198 and 199 into the front and rear faces thereof, respectively. Bearing 176 has a portion 200 which is externally threaded. All the parts of the bearing 176 described in connecton with FIG. 22 can also be seen in FIG. 23.

Figure 24:
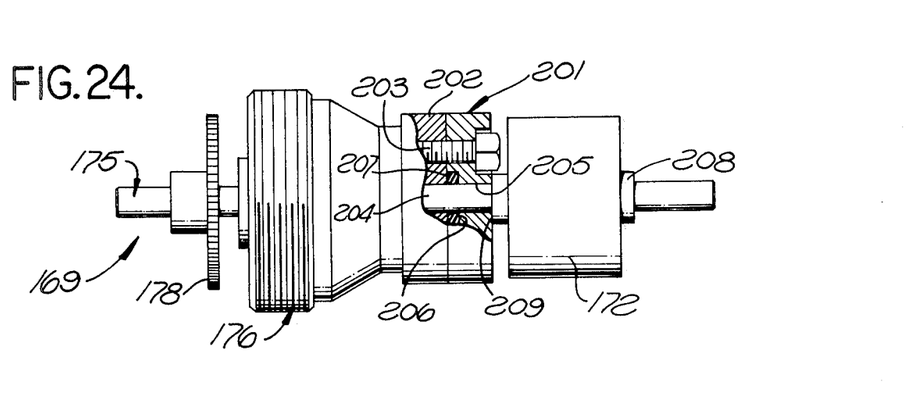
FIG. 24 is a side elevational view of the zero spring assembly.

Another view of the zero spring assembly 169 is shown in FIG. 24. A disc 201 is fixed to the right end 202 of bearing 176 by preferably three or four or more screws 203, only one of which is shown in FIG. 24. Shaft 175 has a portion 204 integral therewith which is rotatable in bearing 176 and in disc 201. For this purpose, disc 201 has a bore 205 through which shaft 175 extends. Disc 201 also has a counterbore at 206, the end surface thereof and this counterbore 206 forming with bearing 176 an O-ring groove in which an O-ring 207 is located around shaft portion 204. Shaft 175 has a portion 208 integral therewith which has a diameter somewhat larger than its diameter throughout the remainder of its length. Note will be taken that shaft 175 cannot slide to the left, as viewed in FIG. 24, beyond the position shown because shaft portion 208 abuts disc 201 at the location 209 shown in FIG. 24. This is true because disc 201 remains stationary, it being fixed to bearing 176 by screws 203, and bearing 176 being screwed in tight to block 108', as described previously.

Figures 25, 26:
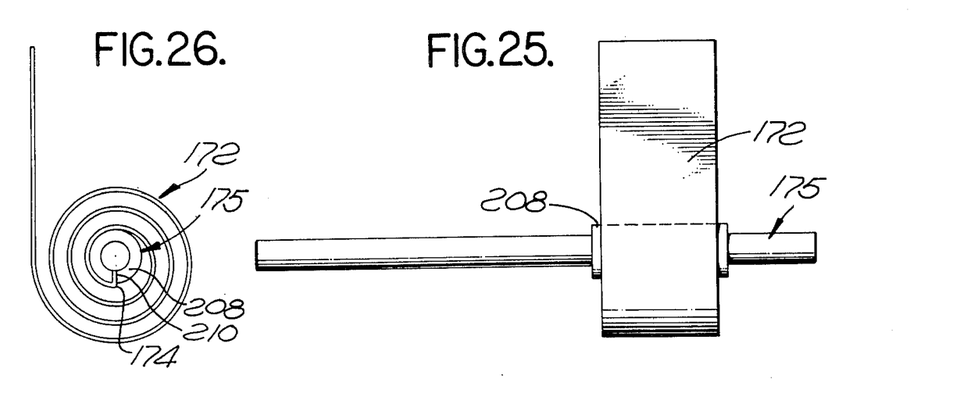
FIG. 25 is a side elevational view of the zero spring shaft and the spring carried thereby.
FIG. 26 is an end elevational view of the zero spring shaft and the spring carried thereby.

Further detail concerning spiral spring 172 and shaft 175 is shown in FIGS. 25 and 26. In FIG. 26, the inner end 174 of spiral spring 172 may be fixed in a slot 210 in shaft portion 208, if desired, and as shown. Further, if desired, spiral spring 172 may be bonded to shaft portion 208 for ½ turn around shaft portion 208 from the inner end 174 of spring 172, as shown in FIG. 26. The range spring assembly is again shown in FIGS. 27 and 28.

Figures 27, 28, 29:
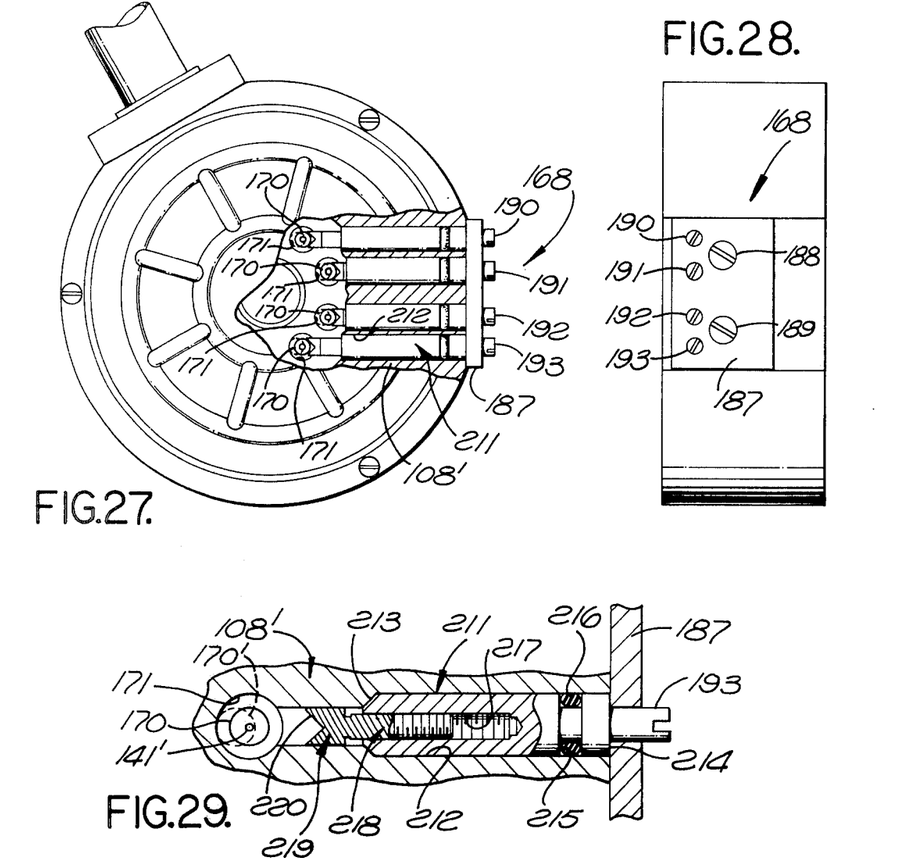
FIG. 27 is a side elevational view, partly broken away, of the central body of the DPU of FIGS. 17–19, inclusive.
FIG. 28 is a side elevational view of the structure shown in FIG. 27.
FIG. 29 is an enlarged view of means to clamp one end of a range spring in place.

In FIG. 27, range spring adjustments are shown for four springs. However, all of these adjustments are essentially identical. Only one such adjustment will, therefore, be described.

In FIG. 27, a member 211 is rotatable is rotatable in bore 212 of block 108'. Screw 193 is integral with member 211 shown in FIG. 29. Screw 193 is not exactly a screw because member 211 stays in a substantially fixed axial position. Member 211 cannot move axially to the left, as viewed in FIG. 9, because it abuts a shoulder 213 of block 108' in bore 212. Member 211 has a shoulder 214 which abuts cover plate 187 that is fixed relative to block 108' by screws 188 and 189 shown in FIGS. 21 and 28. Member 211 has an O-ring groove 215 and an O-ring 216 therein which seals betweem member 211 and bore 212 as shown in FIG. 29. Member 211 has a threaded bore 217 into which a member 218 is threaded. Member 218 has an end portion 219 that is notched at 220 to seize the said enlargement 170 fixed to range spring end 141' controlled by member 211 and to clamp it against the bore 171 of block 108' in the position shown at 170' in FIG. 29.

Figure 30:
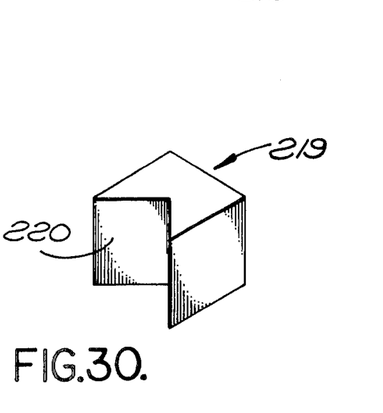
FIG. 30 is an enlarged perspective view of one of the structures shown in FIG. 29.
Figure 31:
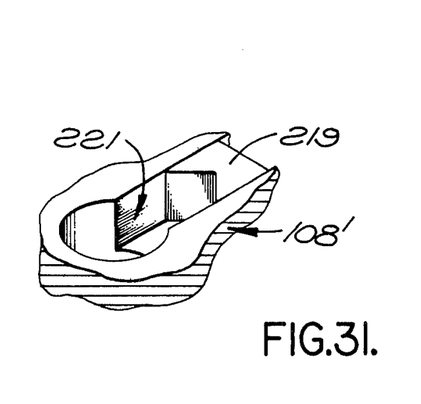
FIG. 31 is a perspective view of a portion of the DPU body and the device of FIG. 30 slidably mounted in a groove therein.

Member portion 219 is again shown in FIGS. 30 and 31. Portion 219 is slidable in a groove 221 in block 108' as shown in FIG. 31. Although it is not necessary, member portion 219 may be a perfect cube except for the notch 220 therein. Further, if desired, the groove 221 in FIG. 31 may have a depth and width equal to the length of one side of the said cube.

Any conventional electronic zero and/or span adjustment may or may not be used in addition to the range spring and zero spring adjustments disclosed herein, as desired. Conventional electronic zero and span adjustments are disclosed in U.S. Pat. No. 3,578,886 which may be employed with the present invention. For example, it is typical in this patent that a single pole, multiple throw range switch and/or potentiometer are provided simply to reduce or increase the gain of a conventional or operational or other amplifier. It is also known that this can be done with an analog adder using a summing amplifier with a feedback resistor adjustable continuously or in steps. The same is true of an input to the adder, which may be provided by a potentiometer or in steps from a plurality or resistors connected from a single pole, multiple throw switch. For example, see U.S. Pat. No. 3,722,264.

The phrase "order to magnitude less than" is hereby defined for use herein and in the claims to means "not more than about one-tenth of."

From the foregoing, it will be appreciated that one, two, three or four or more of the range springs 140' may be employed with or without zero spring 172, and vice versa. Some of this statement may be described another way. That is, there may be first, second, third . . . $n^{th}$ springs, if desired, where $n$ is any positive integer. This last sentence is hereby a definition for use herein and in the claims to mean that any number of range springs including one or more thereof may be employed.

The range spring 140' have respective force constants of 125, 250, 500 and 1,000 in units of pounds per inch. These numbers may be considered accurate, if desired, within ±5 percent. The force constants of the range springs 140' may also be described another way. That is, first, second, third . . . $n^{th}$ springs can be described having force constants $2^1k$, $2^2k$, $2^3k$ . . . $2^nk$, where $k$ is a constant. For ther first spring 140' to have a force constant of 125 pounds per inch, the $k$ in this case is, therefore, 62.5 pounds per inch.

This application contains some subject matter common to that disclosed in application L. T. Garnett-L. D. Lyon 4-1, L.T. Garnett 5 and L. D. Lyon 2 filed concurrently herewith.

In FIG. 16, the diaphragm of curve 160 has an equally bad linearity when deflected in the opposite direction and an undesirable abrupt change in rate at a neutral (e.g. zero deflection) position. The diaphragm of the curve 159 had an equally good linearity when deflected in the opposite direction (one-half of nonlinearity indicated in FIG. 16) and no undesirable abrupt change in rate at a neutral position. In these two instances. "rate means the slope of the curves 159 and 160 on opposite sides of the neutral position at small positive and negative deflections, e.g. at deflections of ±0.008 inch, more or less.

The tapped hole 68 in FIG. 5 has been omitted in FIG. 11 for clarity.

Figure 32:
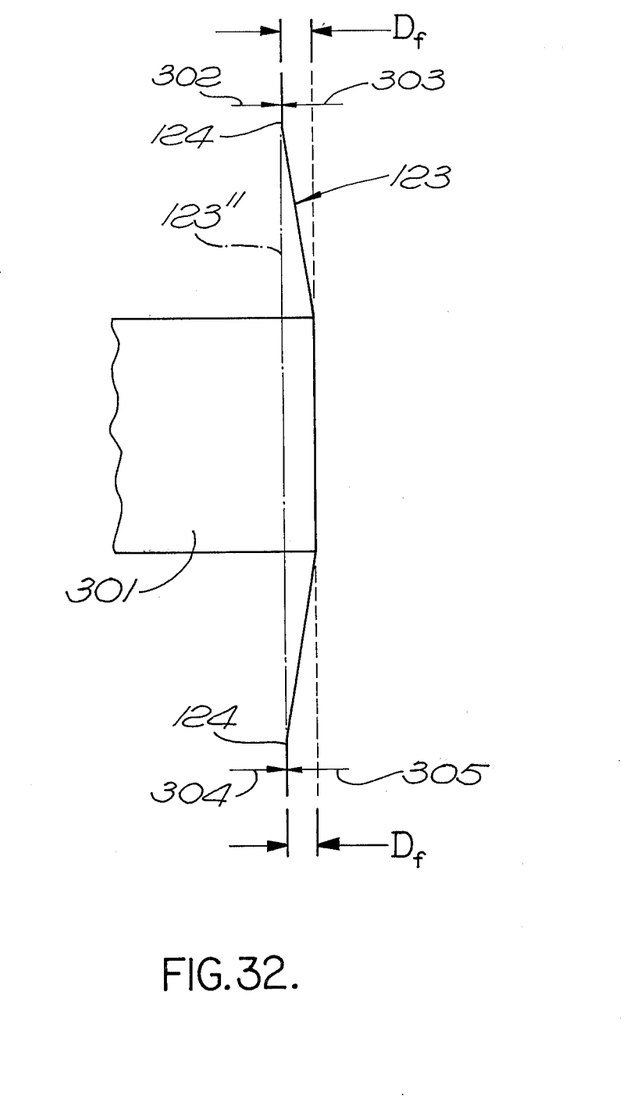
FIG. 32 is a schematic diagram illustrating the cold working process of the present invention.

In the cold working process of the present invention, the marginal surface portion 124 of diaphragm 123 in FIG. 13 is first seam welded to plate 109 as shown in FIG. 11. Plate 109 and diaphragm 123 (portion 124) are then held in any conventional vise, jig or otherwise while a force at 300 (FIG. 15) is applied to diaphragm central portion 126 (FIG. 13) in the direction of arrow 300 toward the diaphragm relieved side (not the embossed side). As shown in FIG. 32, this can be done by a cylindrical mandrel 301 having a surface normal to its axis the same size as diaphragm central portion 126 (FIG. 13). The mandrel 301 and the vise or chuck may be mounted in an entirely conventional arbor press, if desired. Diaphragm 123 is then deflected beyond its elastic limitor yield point. The deflection $D_f$ may be 3/32 inch to ⅛ inch, if desired. See FIG. 32. Diaphragms 123 and 123" are respectively illustrated in solid lines and dotted lines in their stressed and unstressed positions, respectively, in FIG. 32. Diaphragm portion 124 may be held at one, two or more equally angularly spaced positions or around the complete circumference thereof as indicated by arrows 302, 303, 304 and 305 in FIG. 32.

The phrase "spring rate" can mean several things. In this specification it may be considered to mean the rate of change of the difference of the pressures on opposite sides of a diaphragm with respect to the ratio of diaphragm deflection at the center thereof to the diaphragm diameter, e.g. the diameter R of diaphragm 123 in FIG. 13.

The phrase "zero shift" means the shift of a diaphragm zero point with temperature, line pressure or any other variable.

WHAT IS CLAIMED IS:

1. The method of making a force sensitive member comprising the steps of: forming a generally planar thin circular metal diaphragm with a generally symmetrical center and an axis through said center normal to the diaphragm plane; forming said diaphragm with a flat circular portion around said center and a flat annular portion at its outer edge between an inner circle and an outer circle concentric with said inner circle; forming said diaphragm with said annular portion is a position such that both of said circles are concentric with said diaphragm axis; forming said diaphragm in a manner such that said outer circle has a predetermined diameter; forming said diaphragm with a thickness that is substantially less than said outer circle diameter; forming said diaphragm with an intermediate portion connected between said circular and annular portions thereof; embossing said diaphragm on one side thereof to provide a wheel-shaped embossment on said one side thereof; relieving said diaphragm on the side thereof opposite said one side; embossing said diaphragm in a manner to provide a hub portion, a rim portion and a plurality of spokes within said embossment; embossing said diaphragm in a manner to cause said hub portion to be connected from said diaphragm circular portion to said spokes; embossing said diaphragm in a manner to cause said hub portion to have a surface in the shape of one-half of a first torus cut by a plane normal to its axis where said first torus axis is congruent with said diaphragm axis; embossing said diaphragm in a manner to cause said rim portion to be connected from said spokes to said diaphragm annular portion and said rim portion to be spaced radially from said hub and to have a surface in the shape of one-half of a second torus cut by a plane normal to its axis where said second torus axis is also congruent with said diaphragm axis; said hub portion, said rim portion and said spokes all being embossed on the same side, i.e. said one side, of said diaphragm intermediate portion; said hub portion, said rim portion and said spokes all being concavo-convex and defining respective channels in the other side of said diaphragm due to the approximately uniform thickness thereof; the channel of each spoke communicating with both of those of said hub and rim portions; forming said diaphragm intermediate portion with a flat arcuate portion filling the gap between said connected between each pair of immediately adjacent spokes and filling the gap between and connected between the respective hub and rim portions connecting each said respective pair of immediately adjacent spokes; said spokes being uniformly distributed around and projecting in radial directions from said diaphragm axis; and holding said diaphragm annular portin while applying a force against the center of said diaphragm approximately normal thereto on said opposite side thereof of a magnitude sufficient to stretch said diaphragm beyond the yield point thereof.

2. The invention as defined in claim 1, wherein each of said spokes is formed approximately in the shape of a thin hollow half cylinder of approximately concentric internal and external surfaces which are uniform in diameter throughout the length of each respective spoke with all of said internal spoke surface diameters being the same, with all of said external spoke surface diameters being the same and with each half cylinder being formed by cutting a thin hollow cylinder with a plane through the cylinder axis.

3. The invention as defined in claim 2, wherein said diaphragm is formed with 17-7 precipitation hardenable stainless steel; said diaphragm also being formed with eight spokes and in a manner such that each immediately adjacent pair of spokes have radial axes regularly spaced apart 45 degrees.

4. The invention as defined in claim 1, wherein said diaphragm is formed of a precipitation hardenable metal.

5. The invention as defined in claim 2, wherein said diaphragm is formed of a precipitation hardenable metal.

* * * * *